United States Patent
Takeuchi

(10) Patent No.: US 7,826,492 B2
(45) Date of Patent: Nov. 2, 2010

(54) COMMUNICATION SYSTEM, CYCLE MASTER NODE AND COMMUNICATION METHOD

(75) Inventor: Junichi Takeuchi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 851 days.

(21) Appl. No.: 11/440,399

(22) Filed: May 25, 2006

(65) Prior Publication Data

US 2006/0282598 A1 Dec. 14, 2006

(30) Foreign Application Priority Data

May 26, 2005 (JP) ............................. 2005-154653

(51) Int. Cl.
H04J 3/06 (2006.01)
H04L 12/28 (2006.01)
G06F 3/00 (2006.01)
G06F 13/20 (2006.01)

(52) U.S. Cl. .................. 370/509; 370/395.62; 370/507; 710/61; 710/313

(58) Field of Classification Search ............ 370/395.62, 370/503, 507, 509, 510, 511, 512, 513, 514; 710/61, 305, 306, 313
See application file for complete search history.

(56) References Cited

U.S. PATENT DOCUMENTS

| | | | | |
|---|---|---|---|---|
| 6,272,114 B1* | 8/2001 | Kobayashi | .................. | 370/257 |
| 6,502,155 B1* | 12/2002 | Kondo et al. | ................. | 710/305 |
| 6,570,945 B1* | 5/2003 | Ono et al. | .................... | 375/359 |
| 7,460,560 B2* | 12/2008 | Bruckner et al. | ............ | 370/508 |
| 2002/0156087 A1* | 10/2002 | Nuss et al. | ................... | 514/256 |
| 2003/0053466 A1* | 3/2003 | Bizet et al. | .................. | 370/401 |
| 2003/0204704 A1* | 10/2003 | Hamlin | ........................ | 712/36 |
| 2004/0082356 A1* | 4/2004 | Walton et al. | ............... | 455/522 |
| 2005/0009546 A1* | 1/2005 | Shimizu et al. | ............. | 455/502 |
| 2007/0011375 A1* | 1/2007 | Kumar | ....................... | 710/106 |

FOREIGN PATENT DOCUMENTS

| DE | 10157680 A1 | 6/2003 |
|---|---|---|
| DE | 102004063213 A1 | 7/2006 |
| JP | 11-215132 A | 8/1999 |
| JP | 2003-517749 A | 5/2003 |
| JP | 2004-282565 | 10/2004 |
| JP | 2005-031291 A | 2/2005 |

OTHER PUBLICATIONS

German Office Action for Serial No. 10 2006 024 744.2-31 completed Jan. 18, 2010.*

* cited by examiner

Primary Examiner—Daniel J Ryman
Assistant Examiner—Thinh D Tran
(74) Attorney, Agent, or Firm—Sughrue Mion, PLLC

(57) ABSTRACT

A communication system carrying out an isochronous transfer, includes a cycle master node and nodes connected with each other through a system bus. The cycle master node sets a cycle time of the isochronous transfer and transfers a cycle start packet onto the system bus for every the cycle time. Each of the nodes transfers an isochronous packet onto the system bus in response to the cycle start packet.

6 Claims, 9 Drawing Sheets

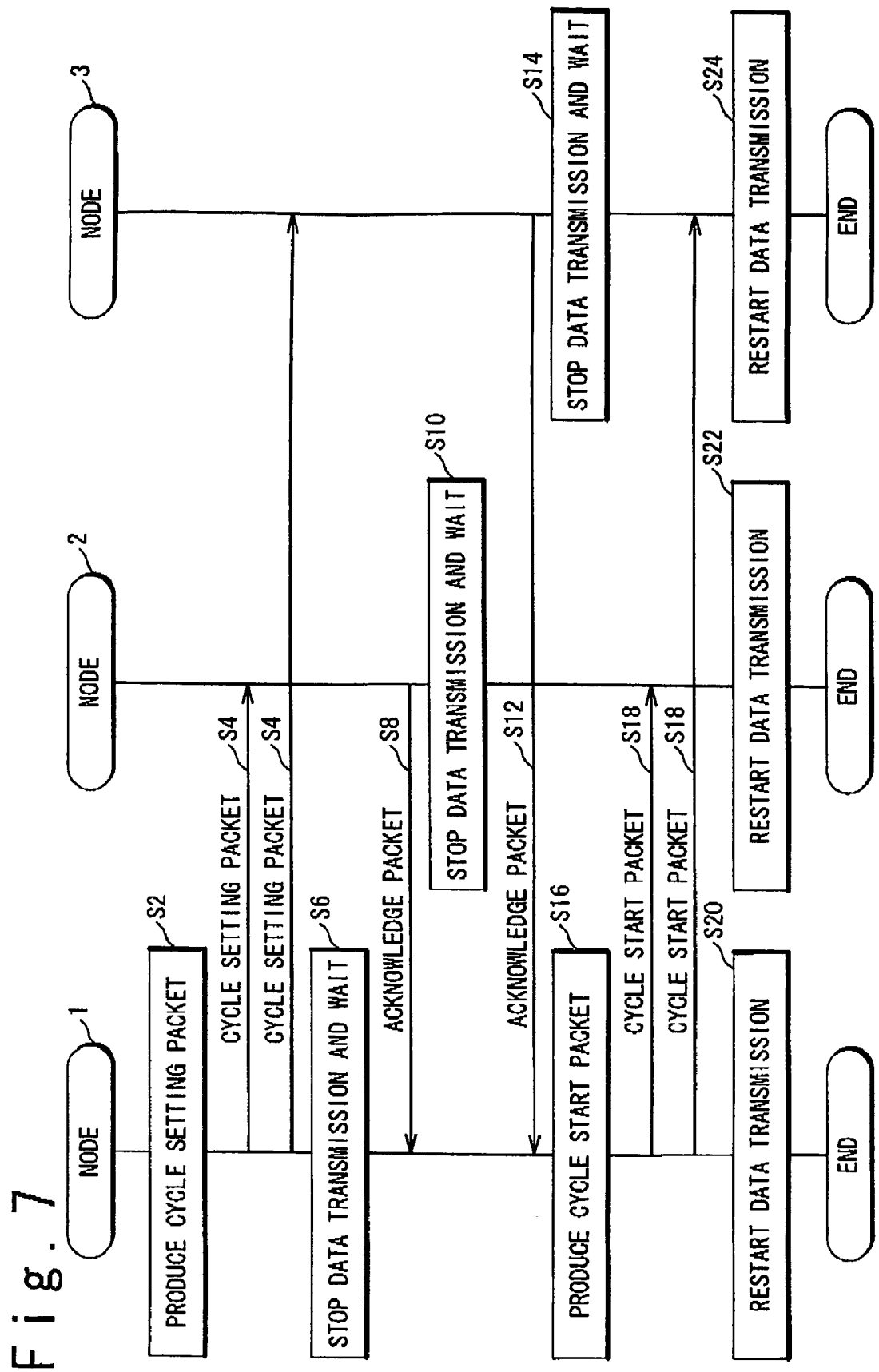

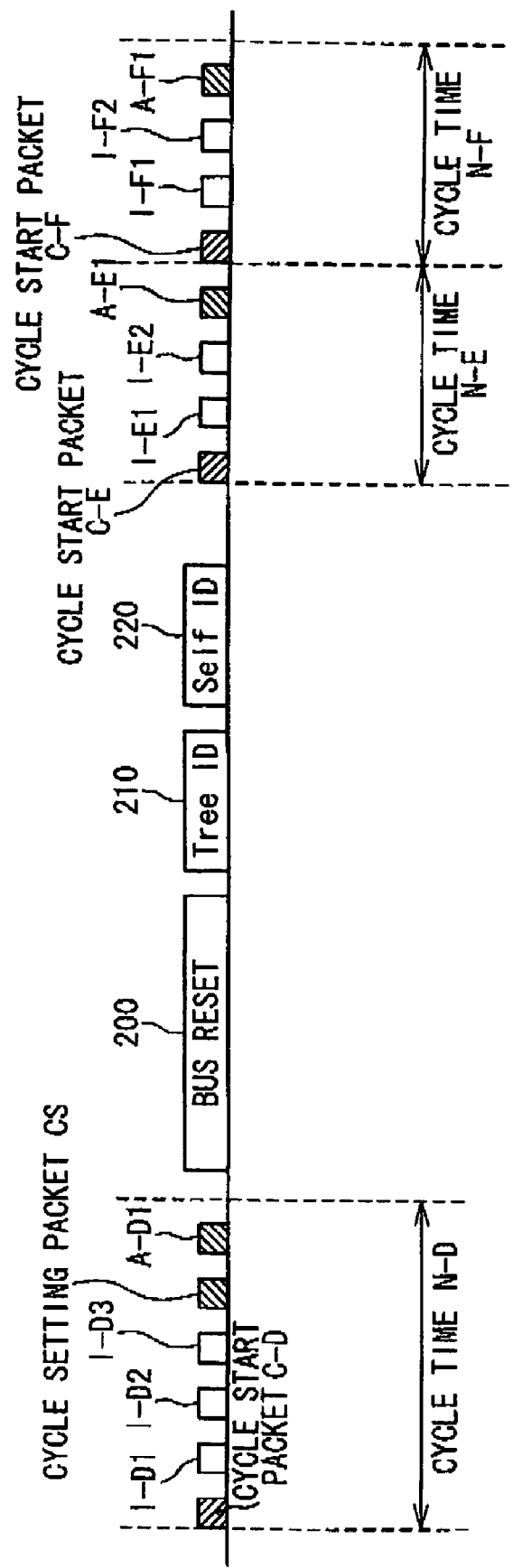

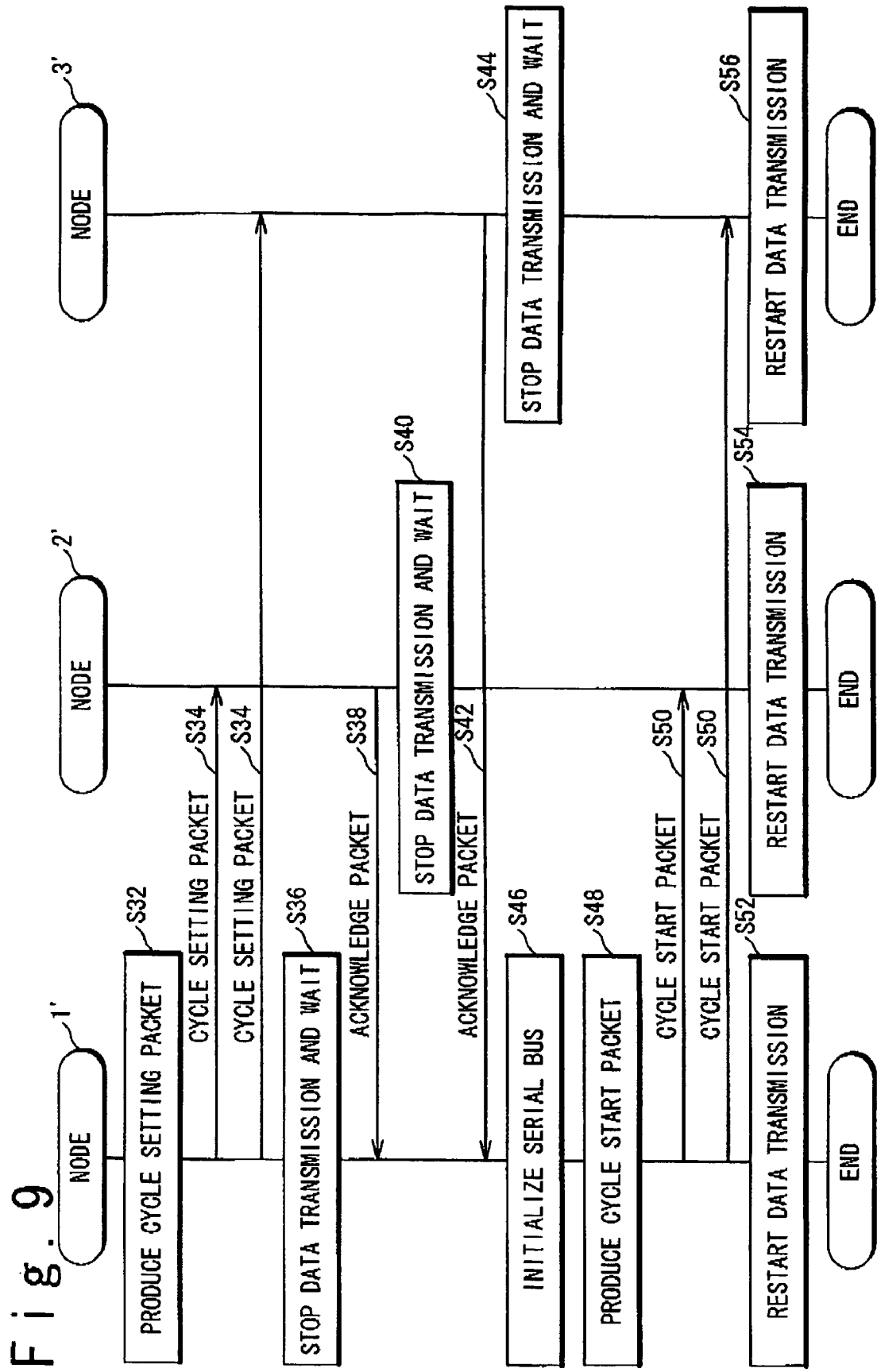

COMMUNICATION SYSTEM, CYCLE MASTER NODE AND COMMUNICATION METHOD

BACKGROUND OF THE INVENTION

1. Field of the Invention

The present invention relates to a communication system of nodes, and a communication method. More specifically, the present invention relates to a communication system having a serial interface of real-time characteristic, a cycle master node used in the communication system, and a communication method.

2. Description of the Related Art

Recently, attention is paid to IEEE 1394 as a standard of a real-time, high-speed, high-function multimedia-compliant serial interface. The IEEE 1394 interface is used for connection with peripheral devices such as a digital video camera or a hard disk drive, required to transmit a large amount of data at high speed. The IEEE 1394 interface has a communication rate as high as 100 Mbit/sec to 800 Mbit/sec, and data is transferred in isochronous transfer or asynchronous transfer. The isochronous transfer is a transfer mode used for a serial interface such as a USB in addition the IEEE 1394 interface, particularly used for a peripheral device that requires real-time characteristics. In the isochronous transfer suited for the multimedia, data is transferred for a short transfer time allocated to each of the devices within a constant cycle time (125 μs according to the IEEE 1394). For this reason, even if an access has occurred suddenly, data can be transferred from a device to each of the other devices for the transfer time allocated to each device.

Referring to FIGS. 1 to 4, a conventional IEEE 1394-compliant communication system will be described.

FIG. 1 is a block diagram showing a configuration of a conventional device (node) connected to a serial bus through an IEEE 1394-compliant interface. Referring to FIG. 1, a cycle master 1230 of a serial bus control unit 120 manages and controls a cycle time of 125 μs and generates a cycle start signal used for transferring a cycle start packet C for every 125 μs. A cycle control circuit 1410 of a link layer 140 transfers the cycle start packet C onto a serial bus 160 through a physical layer 150 in response to the cycle start signal from the cycle master 1230. Thus, it becomes possible to carry out time manage or control for the entire serial bus 160.

The serial bus control unit 120 and a transaction layer 130 are controlled by an application/software driver 110. The serial bus control unit 120 includes a bus manager 1210, an isochronous resource manager (IRM) 1220, the cycle master 1230, and a node controller 1250. The serial bus control unit 120 provides a set of a protocol, a service, and an operation procedure for monitoring and controlling various layers of the serial bus 160. Depending on the node, the serial bus control unit 120 does not include the bus manager 1210 and the IRM 1220. In such a case, a different node can play roles of the bus manager 1210 and the IRM 1220. If the bus manager 1210 is not provided, the IRM 1220 is often carries out a part of functions of the bus manager 1210.

The bus manager 1210 includes a power supply control function, a function of optimizing performance of the serial bus 160, and a function of installing a topology map, a speed map or the like. The IRM 1220 manages resources for isochronous transmission. If the bus manager 1210 is not present on the serial bus 160, the IRM 1220 designates one of nodes as the cycle master 1230. The cycle master 1230 transfers a cycle start request signal to the cycle control circuit 1410 of the link layer 140 such that a cycle start packet is transferred for every 125 μs. The node controller 1250 functions to monitor a state (connection and utilization state) of the node.

The transaction layer 130 is one of IEEE 1394-compliant logic layers, and is a layer that defines request/response protocol and that includes read and write functions and a lock function among a protocol layer stack specified for the serial bus 160.

The link layer 140 is present between the transaction layer 130 and the physical layer 150, and serves as an interface for both of the transaction layer 130 and the physical layer 150. The link layer 140 carries out addressing, data verification, and data framing. The link layer 140 includes the cycle control circuit 1410 and a data transfer circuit 1420, and carries out an asynchronous subaction process and an isochronous subaction process. Services provided by the link layer 140 are roughly divided into four, i.e., packet transmission from a link requester to a link responder (Request), packet reception by the link responder (Indication), acknowledgement transmission by the link responder (Response), and acknowledgement reception by the link requester (Confirmation).

The cycle control circuit 1410 outputs the cycle start packet C to the serial bus 160 for every 125 μs in response to the cycle start request signal from the cycle master 1230. The data transfer circuit 1420 transfers packet data generated by an application to the physical layer 150.

The physical layer 150 includes a bus control circuit 1510 and a transmission & reception circuit 1520. The bus control circuit 1510 carries out arbitration in response to a request from the link layer 140, and guarantees that only one node can transmit data on the serial bus 160. The transmission & reception circuit 1520 transfers the packet data from the data transfer circuit 1420 to the serial bus 160. In case of the isochronous subaction, the transmission/reception circuit 1520 transfers the packet data to the serial bus 160 while securing a channel.

FIG. 2 is a conceptual diagram of a conventional communication system of nodes 1 to 3 connected to one another by a serial bus. For instance, A1 to A3 are added as symbols subsequent to a reference symbol I that denotes each of isochronous packets transmitted from nodes 1 to 3 in a cycle time N-A. Likewise, B1 to B3 and C1 to C3 are added as symbols subsequent to the reference symbol I that denotes each of isochronous packets transmitted from the nodes 1 to 3 in a cycle time N-B and a cycle time N-C, respectively. In addition, A1 to A3 are added as symbols subsequent to a reference symbol A that denotes each of asynchronous packets transmitted from the nodes 1 to 3 in the cycle time N-A, respectively. Likewise, B1 to B3 and C1 to C3 are added as symbols subsequent to the reference symbol I that denotes each of asynchronous packets transmitted from the nodes 1 to 3 in the cycle time N-B and the cycle time N-C, respectively.

FIG. 3 is a conceptual diagram of the packets transferred onto the serial bus 160 in the conventional communication system. Referring to FIG. 3, an example of timings when packets are transferred onto the serial bus 160 in the conventional technique will be described. As shown in FIG. 3, when the node 1 is designated as a cycle master node, the cycle master 1230 of the node 1 transmits the cycle start request signal to the cycle control circuit 1410 for every 125 μs. In addition, the cycle control circuit 1410 of the node 1 transfers the cycle start packet C to the serial bus 160 to control a cycle time N. During the cycle time N since the cycle start packet C is transferred, a node that acquires a bus control right through arbitration transmits the isochronous packet I onto the serial bus 160. In addition, the asynchronous packet A is transmitted to a designated node by using a free band. For instance, in the cycle time N-A, a cycle start packet C-A and isochronous packets I-A1 to I-A3 are transmitted onto the serial bus 160, and asynchronous packets A-A1 and A-A2 are transmitted to the designated node. In the cycle time N-B, a cycle start packet C-B and isochronous packets I-B1 to I-B3 are transmitted to the serial bus 160, and asynchronous packets A-B1 and A-B2 are transmitted to the designated node. In the cycle time N-C, a cycle start packet C-C and isochronous packets I-C1 to I-C3 are transmitted to the serial bus 160, and asynchronous packets C-C1 and C2 are transmitted to the designated node.

According to the IEEE 1394, the cycle time N is specified as a time in a cycle of 125 µs. Normally, one synchronous packet transmission right is acquired for every cycle. According to the IEEE 1394, therefore, a minimum interval of packet transmission is once for every 125 µs. For this reason, if the node 1 shown in FIG. 2 is to transmit the isochronous packets I-A1 and I-E1, the node 1 needs to transmit the isochronous packet I-A1, to wait for the next cycle packet C-B, and then to transmit the isochronous packet I-B1.

A technique for reducing a delay time resulting from such a cycle time N is disclosed in Japanese Laid Open Patent Publication (JP-P2004-282565A). In this conventional example, a method is disclosed for transmitting packets several times for every 125 µs by giving a procedure of securing a band in synchronous transmission period to an isochronous resource manager (IRM) under the presumption of the IEEE 1394. In the isochronous transmission method of this conventional example, an IEEE 1394-compliant communication device includes the IRM connected to a serial bus and executes the following steps (1) to (7). At the step (1), a time from the start of a cycle to the end of transmission of an isochronous packet is calculated. At the step (2), whenever the node acquires a bandwidth and a channel, a set of the time from the start of the cycle to the end of the transmission of the isochronous packet, the acquired bandwidth, and the acquired channel are stored. At the step (3), the IRM acquires a bandwidth by the end of one request cycle time. At the step (4), it is determined that the request time passes. At the step (5), a channel different from the previously acquired channel is acquired for a next transfer. At the step (6), different channel numbers as many as the number of times of transmitting packets within 125 µs are acquired. At the step (7), an isochronous packet is transmitted with a delay from the cycle start.

According to the IEEE 1394, the cycle time N is specified as 125 µs. Usually, the transmission right of a synchronous packet is given once per one cycle. Thus, in the IEEE 1394, therefore, the minimum interval of packet transmission is 125 µs. For this reason, a maximum delay time of 125 µs is caused. A waiting time up to the cycle time is caused when data is isochronously transmitted, and a transfer delay time is increased. This greatly influences a transfer rate.

In the above conventional isochronous transmission method, the transmission of a plurality of times of synchronous packets within one cycle is permitted. Therefore, it is possible to narrow the minimum interval of packet transfer. However, the synchronous packet transfer time is specified as up to 100 µs according to the IEEE 1394. As a result, it is required that an asynchronous transmission time of 25 µs (=125 µs−100 µs) is necessarily secured, and a time (at least 25 µs) is present during which a band cannot be guaranteed. In this way, the communication system disadvantageously has a long delay time.

For example, in case of a communication system of an imaging device and a data processing device connected to each other by a network, in which system an operation of an operation target is controlled based on a picked-up image data, a transfer rate in the transfer of the image data is an important factor for controlling the operation target. Referring to FIGS. 4A to 4C, the imaging device picks up an image of the operation target within an imaging range, and transfers the picked-up image data of the target to a control device through a network such as an IEEE 1394-compliant network. The control device processes the transmitted image data, and carries out a control such as grasping the operation target and stopping an operation of the target, as in case (1) shown in FIG. 4B. In such a system, if a time (X+Y) necessary for the operation target to pass through the imaging range is shorter than (imaging time)+(data transfer time)+(data processing time)+(control time), the control fails, as in case (2) shown in FIG. 4C. At this time, if a high-speed network is used, an actual data transfer time can be shortened. However, if the cycle time is long, the waiting time for the cycle time is generated, and an advantage of the high-speed network cannot be made use.

SUMMARY OF THE INVENTION

In an aspect of the present invention, a communication system carrying out an isochronous transfer, includes a cycle master node and nodes connected with each other through a system bus. The cycle master node sets a cycle time of the isochronous transfer and transfers a cycle start packet onto the system bus for every the cycle time. Each of the nodes transfers an isochronous packet onto the system bus in response to the cycle start packet.

Here, the cycle master node transfers a cycle setting packet to the nodes to set the cycle time, and each of the nodes sets the cycle time when receiving the cycle setting packet for and transfers a confirmation packet to the cycle master node. The cycle master node transfers the cycle start packet onto the system bus for every the cycle time when receiving the confirmation packets from all of the nodes to which the cycle setting packet is transferred.

Also, when receiving the cycle setting packet, each of the nodes may stop a data transfer during a predetermined waiting time for cycle change.

Also, the cycle setting packet may be transferred to the node in an asynchronous transfer, and each of the nodes may transfer an acknowledgement packet to the cycle master node in the asynchronous transfer as the confirmation packet.

Also, when receiving the confirmation packets from all of the nodes to which the cycle setting packet is transferred, the cycle master node may reset the system bus and transfers the cycle start packet onto the system bus for every the cycle time.

In another aspect of the present invention, a cycle master node connected with nodes through a system bus in a communication system, includes a cycle manager having a cycle time setting register in which a cycle time of isochronous transfer is set, and configured to refer to the cycle time setting register to specify a cycle time. A cycle master issues a cycle start packet transfer request such that a cycle start packet is issued for every cycle time specified by the cycle manager. A cycle control circuit generates the cycle start packet in response to the cycle start packet transfer request from the cycle master. A transmission circuit transmits the generated cycle start packet onto the system bus. A current cycle time in the communication system is changed into a new cycle time.

Here, the cycle manager may issue a cycle setting packet transfer request to the cycle management circuit such that the cycle time is set. The cycle control circuit may generate a cycle setting packet in response to the cycle setting packet transfer request. The transmission circuit may transmit the cycle setting packet to the nodes.

Also, when receiving confirmation packets to the cycle setting packet from all of the nodes to which the cycle setting packet is transferred, the cycle master may issue the cycle start packet transfer request of to the cycle management circuit.

Also, the cycle master node may further include a bus manager configured to issue a bus reset request to reset the system bus when receiving the confirmation packets to the cycle setting packet from all of the nodes to which the cycle setting packet is transferred; and a bus control circuit configured to execute reset of the system bus in response to the bus reset request.

Still another aspect of the present invention is related to a communication method in a communication system which carries out an isochronous transfer and which includes a cycle master node and nodes connected with each other through a system bus. The method is achieved by setting a cycle time of the isochronous transfer by the cycle master node; by transferring a cycle start packet from the cycle master node onto the system bus for every the cycle time; and by transferring an isochronous packet onto the system bus from the nodes in response to the cycle start packet.

Also, the communication method may be achieved by further transferring a cycle setting packet the cycle master node to the nodes such that the cycle time is set; setting the cycle time in response to reception of the cycle setting packet in each of the nodes; and transferring a confirmation packet from each of the nodes to the cycle master node; and transferring a cycle start packet from the cycle master node onto the system bus for every the cycle time after receiving the confirmation packets from all of the nodes to which the cycle setting packet is transferred.

Also, the communication method may be achieved by further stopping a data transfer during a predetermined cycle change waiting time in each of the nodes in response to reception of the cycle setting packet.

Also, the transferring the cycle setting packet may be achieved by transferring the cycle setting packet from the cycle master node to the nodes in an asynchronous transfer. The transferring the confirmation packet from each of the nodes to the cycle master node may be carried out in the asynchronous transfer.

Also, the communication method may be achieved by further resetting the system bus by the cycle master node after receiving the confirmation packets from all of the nodes to which the cycle setting packet is transferred. The transferring the cycle start packet onto the system bus for every the cycle time is executed after the resetting the system bus.

BRIEF DESCRIPTION OF THE DRAWINGS

FIG. 7 is a sequence diagram of a cycle time change process and a packet transfer process after the cycle time change process in the communication system according to the first embodiment;

FIG. 8 is a conceptual diagram of packets transmitted onto the serial bus in a communication system according to a second embodiment of the present invention; and FIG. 9 is a sequence diagram of a cycle time change process and a packet transfer process after the cycle time change process in the communication system according to the second embodiment.

DESCRIPTION OF THE PREFERRED EMBODIMENTS

Figure 1:
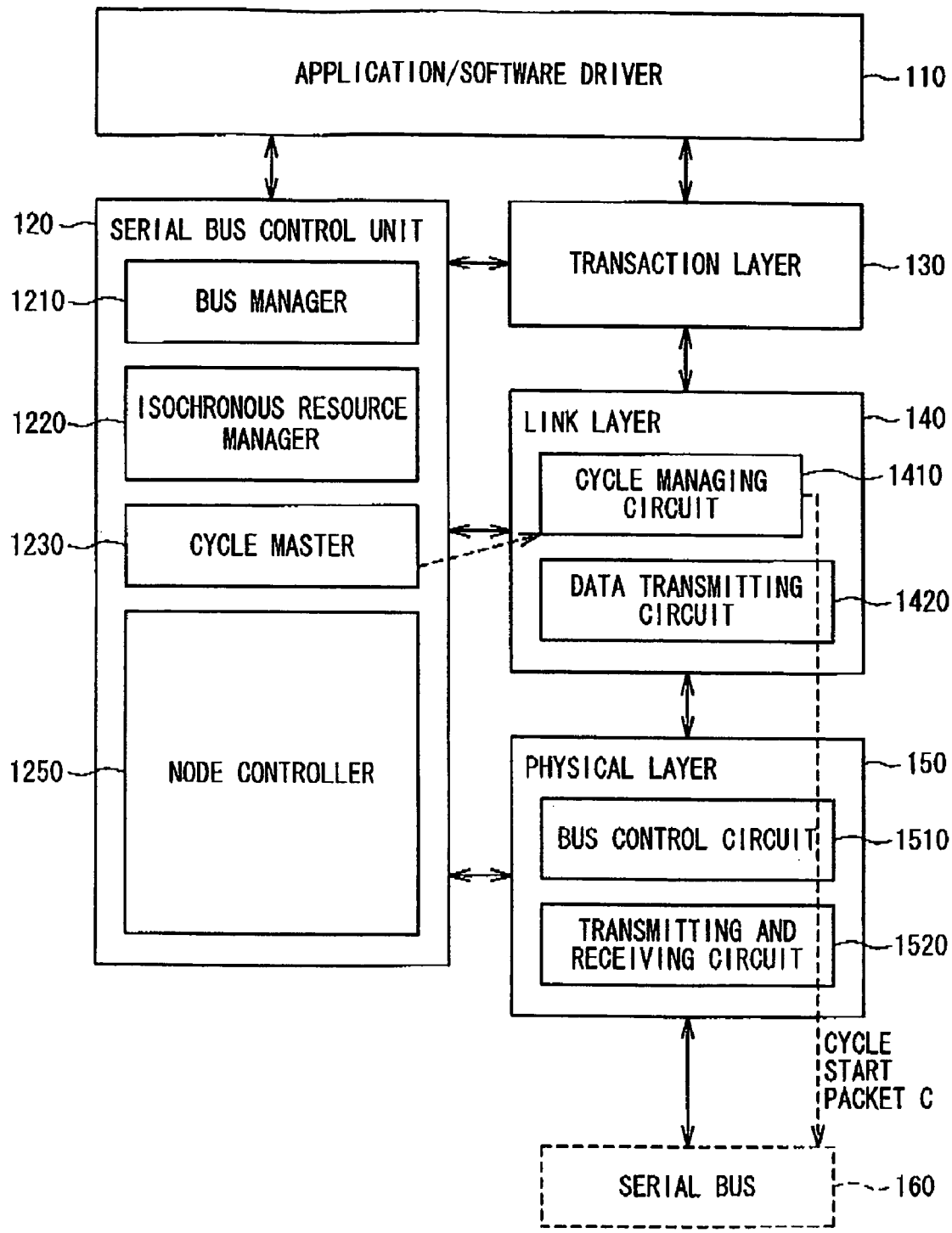
FIG. 1 is a block diagram of a device (a node) connected to a serial bus in a conventional communication system.

Hereinafter, a communication system and a communication method according to the present invention will be described in detail with reference to the attached drawings. As the communication system according to the present invention, an IEEE 1394-compliant communication system using a serial interface that employs an isochronous transfer as a transfer mode is suitably used. In the following description, the same or similar components are allocated with same reference numerals or symbols.

First Embodiment

Figure 2:
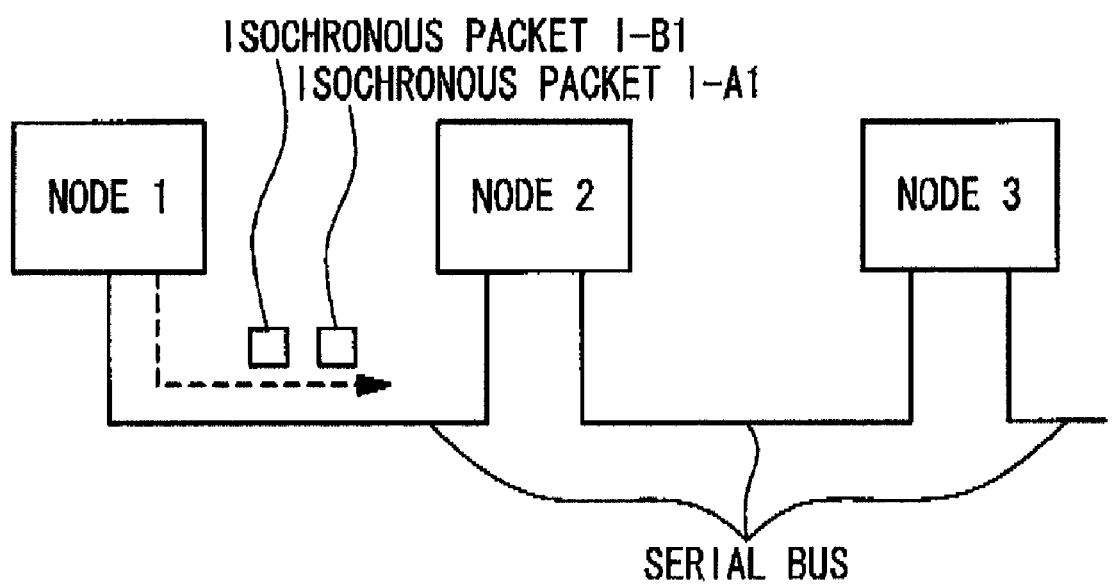
FIG. 2 is a conceptual diagram of a communication system constituted by nodes connected to one another by a serial bus.
Figure 5:
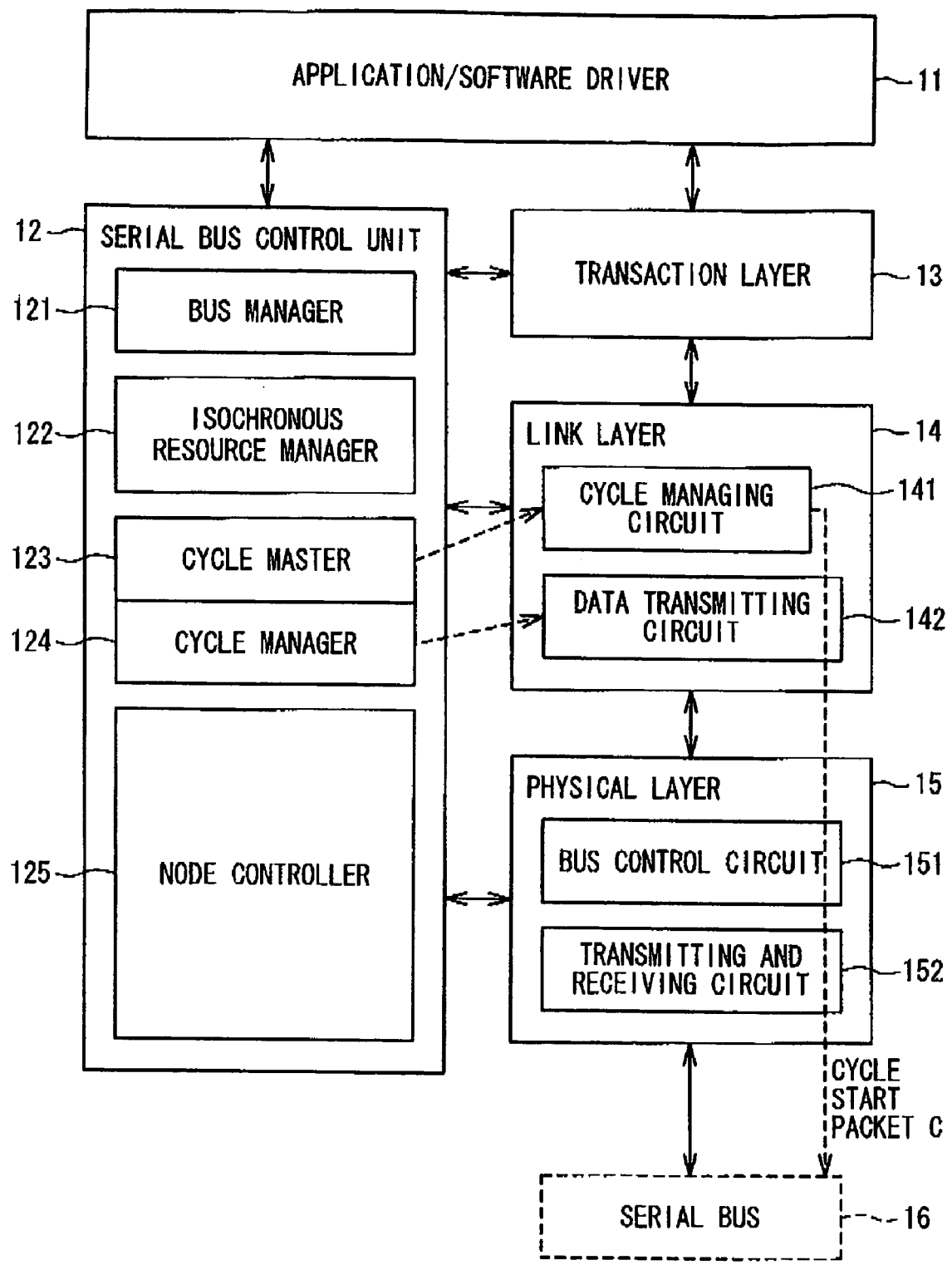
FIG. 5 is a block diagram of a configuration of a node connected to a serial bus in a communication system according to the present invention.

In the communication system according to the first embodiment of the present invention, nodes 1 to 3 are connected to one another by a serial bus 16 by means of, for example, an IEEE 1394-compliant interface, as shown in FIG. 2. FIG. 5 is a block diagram of a node connected to the serial bus 16 in the communication system according to the first embodiment of the present invention. Referring to FIG. 5, the node includes an application/software driver 11, a serial bus control unit 12, a transaction layer 13, a link layer 14, and a physical layer 15. The application/software driver 11 carries out generation and transfer of packet data, control of the node, and the like. The serial bus control unit 12 and the transaction layer 13 are controlled by the application and software driver 11. The node is connected to the serial bus 16 through the physical layer 15.

The serial but control unit 12 includes a bus manager 121, an isochronous resource manager (IRM) 122, a cycle master 123, a cycle manager 124, and a node controller 125. The serial bus control unit 12 is a set of protocol, service, and operation procedure for monitoring and controlling various layers of the serial bus 16.

The bus manager 121 includes a power supply management function, a function of optimizing performance of the serial bus 16, and a function of installing a topology map, a speed map, or the like. The IRM 122 manages resources for isochronous transmission. If the bus manager 121 is not present on the serial bus 16, the IRM 122 designates one of nodes as a cycle master node. The cycle master 123 of the cycle master node issues a cycle start packet transfer request to a cycle control circuit 141 of the link layer 14 so as to transmit a cycle start packet for every cycle time N designated by the cycle manager 124. The cycle manager 124 includes a cycle time setting register, sets the cycle time N in response to a designation from a user (or a designation from an application), and designates the set cycle time N to the cycle master 123. If the present cycle time N is changed, the cycle manager 124 issues a transfer request to the cycle control circuit 141 of the link layer 14 so as to transfer a cycle setting packet CS.

The cycle setting packet CS includes the cycle time N and a cycle change waiting time which are set by the cycle manager 124. The cycle change waiting time is set as a time long enough for all the nodes receiving s the cycle setting packet CS to wait for packet transfer. In each of the nodes other than the cycle master node, the cycle manager 124 receives the cycle setting packet CS and updates the cycle time setting register based on the cycle time N included in the cycle setting packet CS, and changes the cycle time N. The node controller 125 functions to monitor a state of the node such as a connection and a utilization state.

The transaction layer 13 is one of IEEE 1394-compliant logic layers, and is a layer used to define a request/response protocol in a protocol layer stack specified for the serial bus 16 and to achieve read/write functions and a lock function.

The link layer 14 is present between the transaction layer 13 and the physical layer 15, interfaces the transaction layer 13 and the physical layer 15, and carries out addressing, data verification, and data framing. The link layer 14 includes the cycle control circuit 141 and a data transfer circuit 142, and carries out an asynchronous subaction process and an isochronous subaction process.

The cycle control circuit 141 transfers the cycle start packet C to the serial bus 16 usually for every 125 µs in response to the cycle start request from the cycle master 123. In addition, the cycle control circuit 141 generates the cycle setting packet CS in response to a cycle setting packet transmission request from the cycle manager 124, and transfers the cycle setting packet CS to the other node connected to the serial bus 16, At this time, the cycle setting packet CS is transmitted to the other node in a transfer mode that can manage packet arrival, e.g., by the asynchronous subaction. Based on the cycle setting packet CS, the cycle packet C is output to the serial bus 16 for every cycle time N. The data transfer circuit 142 transfers packet data generated by an application to the physical layer 15.

The physical layer 15 includes a bus control circuit 151 and a transmission & reception circuit 152. The bus control circuit 151 carries out arbitration in response to a request from the link layer 14 to guarantee that only one node can carry out data transmission on the serial bus 16. The transmission & reception circuit 152 transfers the packet data transmitted from the data transfer circuit 142 to the serial bus 16.

Figure 6:
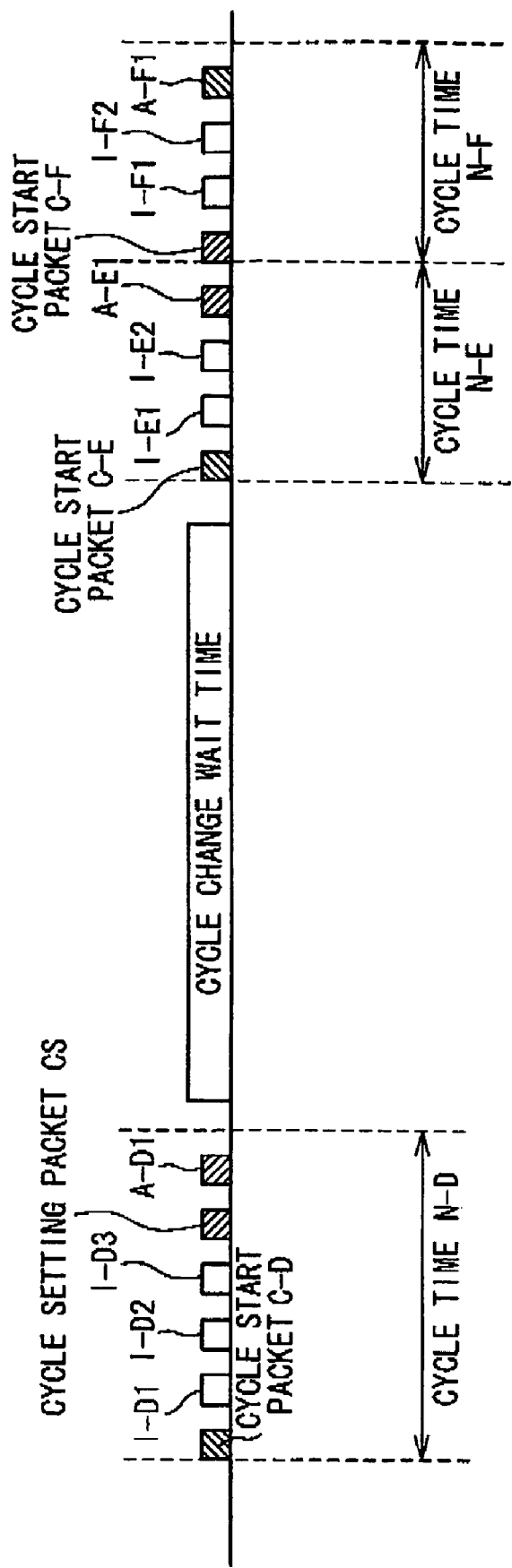
FIG. 6 is a conceptual diagram of packets transmitted onto the serial bus in the communication system according to a first embodiment of the present invention.

Next, an operation for carrying out change of the cycle time N and a packet transfer in the communication system according to the first embodiment of the present invention will be described, with reference to FIGS. 6 and 7. FIG. 6 is a conceptual diagram of packets transferred onto the serial bus 16 in the communication system according to the first embodiment of the present invention. FIG. 7 is a sequence diagram of the process for change of the cycle time N and the packet transfer after the change of the cycle time N in the communication system according to the first embodiment of the present invention.

Figure 3:
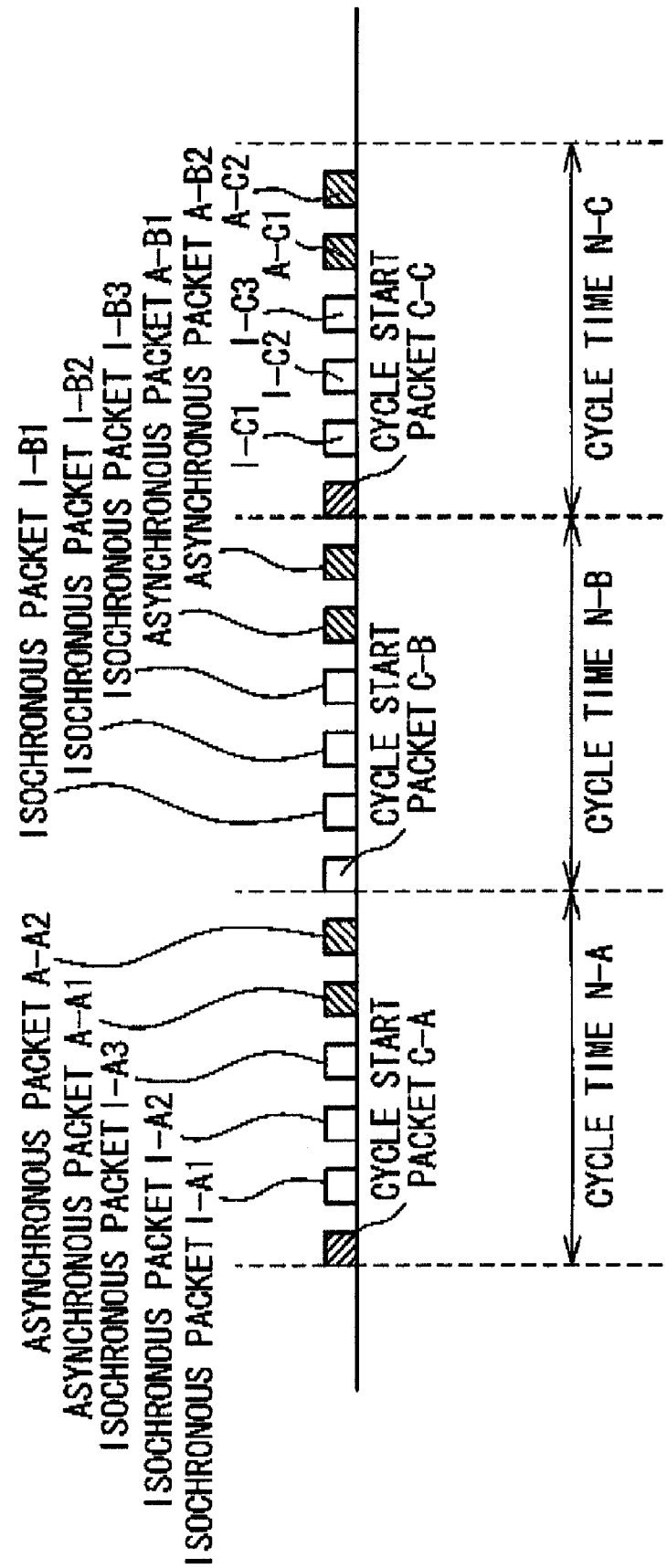
FIG. 3 is a conceptual diagram of packets transferred onto the serial bus in the conventional communication system.
Figure 4A:
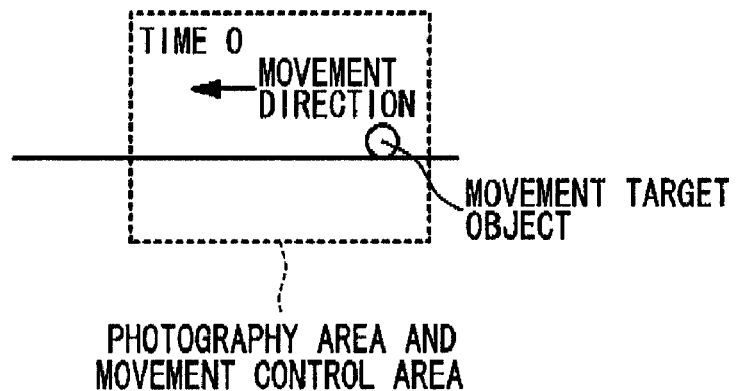
FIGS. 4A to 4C are conceptual diagrams showing disadvantages in the conventional communication system.
Figure 4B:
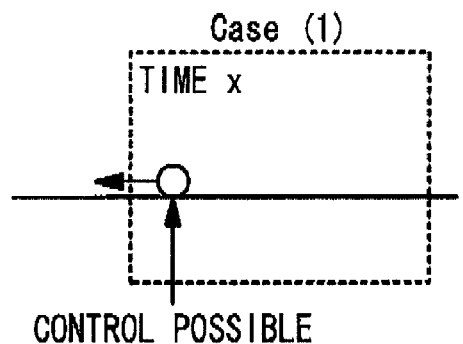
Figure 4C:
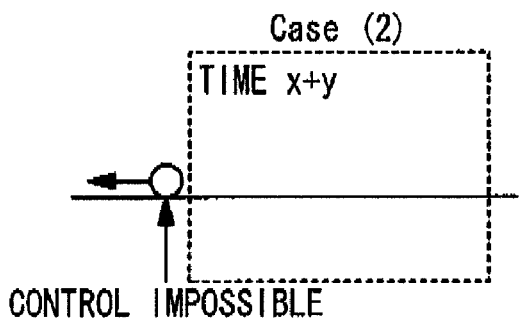

Referring to FIG. 2, the node 1 according to the first embodiment is a cycle master node designated as a cycle master by the IRM 122. In the communication system before the cycle time N is changed, the cycle master 123 of the node 1 transfers a cycle start request signal to the cycle control circuit 141 for every cycle time N (which is, for example, 125 µs according to the IEEE 1394) as shown in FIG. 3. The cycle control circuit 141 transfers the cycle start packet C onto the serial bus 16 in response to this cycle start request signal. When the cycle start packet C is transferred onto the serial bus 16, a node having a bus control right through arbitration transfers isochronous packets I onto the serial bus 16. In addition, one node transfers asynchronous packets A to a designated node by use of a free band.

The cycle manager 124 of the node 1 sets the cycle time N in response to an instruction from the application, and issues a transfer request of the cycle setting packet CS to the cycle control circuit 141. The cycle control circuit 141 generates the cycle setting packet CS of a predetermined format in response to the transfer request (at a step S2). At this time, the cycle setting packet CS is generated to include the cycle time N, the cycle change waiting time, and the like. The cycle control circuit 141 transfers the generated cycle setting packet CS to the nodes 2 and 3 connected to the serial bus 16 through the transmission & reception circuit 152 of the physical layer 15 (at a step S4). The cycle setting packet CS is transferred in the transfer system that can manage packet arrival (e.g., in the asynchronous transfer according to the IEEE 1394). At this time, as shown in FIG. 6, a cycle start packet C-D, isochronous packets I-D1 to I-D3, the cycle setting packet CS, which is an asynchronous packet, and other asynchronous packet A-D1 are transferred onto the serial bus 16 within a cycle time N-D (125 µs).

The data transfer circuit 142 of the node 1 has transferred the cycle setting packet CS, and stops packet transfer to wait for the cycle change waiting time set by the application (time long enough for all the other nodes to stop packet transfer and to wait) (at a step S6). The cycle control circuit 141 of each of the nodes 2 and 3 receives the cycle setting packet CS from the node 1 and confirms that the transferred cycle setting packet CS has the specified format (cycle setting format), and transfers the cycle transfer time N and the cycle setting waiting time included in the cycle setting packet to the cycle manager 124. The cycle manager 124 updates a cycle time setting register based on the cycle transfer time N included in the cycle setting packet. In addition, the cycle transfer circuit 142 transfers an acknowledgment packet ACK to the node 1 as a confirmation signal for the cycle setting packet CS (at steps S8 and S12). The data transfer circuit 142 of each of the nodes 2 and 3 has transferred the acknowledgement packet ACK and then stops packet transfer to wait (at steps S10 and 14). It is noted that each of the nodes 2 and 3 may transfer a confirmation packet in place of the asynchronously transferred acknowledgment packet as long as the node 1 can confirm that each node has received the cycle setting packet CS.

The cycle master 123 of the node 1 receives the acknowledgement packets ACK from all the other nodes (nodes 2 and 3 in this embodiment) connected to the serial bus 16. After passage of the cycle change waiting time, the cycle master 123 issues a transfer request of a cycle start packet C-E to the cycle control circuit 141. The cycle control circuit 141 receives the transfer request of the cycle start packet C-E and generates the cycle start packet C-E (at a step S16), and transfers the generated cycle start packet C-E to the serial bus 16 (at a step S18).

The data transfer circuit 142 of the node 1 transfers the cycle start packet C-E to the serial bus 16 and then restarts transfer of data packets (at a step S20). Likewise, the data transfer circuit 142 of each of the nodes 2 and 3 receives the data packet cycle start packet C-E and restarts transfer of data packets (at steps S22 and S24). For instance, referring to FIG. 6, the node 1 transfers an isochronous packet I-E1 to the serial bus 16, and the node 2 transfers an isochronous packet I-E2 to the serial bus 16. In addition, the node 1 transfers an asynchronous packet A-E1 to a designated node.

After passage of a cycle time N-E designated by the cycle manager 124, the cycle master 123 of the node 1 issues a transfer request of a cycle start packet C-F to the cycle control circuit 141. The cycle control circuit 141 receives the transfer request of the cycle start packet C-F and then generates the cycle start packet C-F (at a step S16), and transfers the generated cycle start packet C-F to the serial bus 16 (at a step S18). The data transfer circuit 142 of the node 1 transfers the cycle start packet C-F to the serial bus 16 and then restarts transfer of data packets (at a step S20). Likewise, the data transfer circuit 142 of each of the nodes 2 and 3 receives the data packet cycle start packet C-F and restarts transfer of data packets (at steps S22 and S24). For instance, referring to FIG. 6, the node 1 transfers an isochronous packet I-F1 to the serial bus 16, and the node 2 transfers an isochronous packet I-F2 to the serial bus 16. In addition, the node 1 transfers an asynchronous packet A-F1 to a designated node.

In this way, the cycle start packet C can be transferred for every cycle time N set newly based on the instruction from the cycle manager 124 of the node 1. In addition, the nodes 1 to 3 can transmit isochronous packets for every cycle time N set newly (at the steps S16 to S24).

As stated above, by transmitting the cycle setting packet CS transferred from the node 1 as the cycle master node, all the nodes 1 to 3 connected to the serial bus 16 can share data on the cycle time N thus set (or changed). The nodes 1 to 3 stop transfer of data packets and wait for a certain time period before completion of setting (the cycle change waiting time) Thus, the cycle time N of the entire serial bus 16 can be changed from the cycle time N-D to the cycle time N-E (or N-F). If the cycle time N-D is 125 µs specified according to the IEEE 1394, a maximum delay time of the isochronous packet I transmitted from each node is the cycle time N-E (or N-F) shorter than 125 µs by setting the cycle time N-E (or N-F) to be shorter than 125 µs. For instance, if the cycle time N-E (or N-F) is set to a smallest packet length (several hundred nanoseconds according to the IEEE 1394), the delay time is reduced to several hundred nanoseconds.

Second Embodiment

Referring to FIGS. 8 and 9, a process for change of the cycle time N and a packet transfer process in the communication system according to the second embodiment of the present invention will be described.

A node 1' in the communication system according to the second embodiment of the present invention differs in configuration from the node shown in FIG. 5 in that a bus manager 121' is provided in place of the bus manager 121. The bus manager 121' issues a reset request to the physical layer 15 to reset the system bus 16 if receiving the acknowledgment packets from all the other nodes that have received the cycle setting packet CS. FIG. 8 is a conceptual diagram of packets transmitted onto the serial bus 16 in the communication system according to the second embodiment of the present invention. FIG. 9 is a sequence diagram of the process of change of the cycle time N and the packet transfer process after the change of the cycle time N in the communication system according to the second embodiment of the present invention.

Referring to FIG. 2, the node 1' according to this embodiment is a cycle master node designated as a cycle master by the IRM 122. In the communication system before the cycle time N is changed, the cycle master 123 of the node 1' issues a cycle start request to the cycle control circuit 141 for every cycle time N (which is, for example, 125 µs according to the IEEE 1394) as shown in FIG. 3. The cycle control circuit 141 transfers the cycle start packet C onto the serial bus 16 in response to this cycle start request signal. When the cycle start packet C is transferred onto the serial bus 16, a node having a bus control right through arbitration transfers an isochronous packet I onto the serial bus 16. In addition, the node transfers an asynchronous packet A to a designated node using a blank band.

The steps S32 to S44 for nodes 1' to 3' according to the second embodiment are the same as the steps S2 to S14 according to the first embodiment, and these steps will not be repeatedly described herein.

If the bus manager 121' of the node 1' transmits the cycle setting packet and then receives acknowledgement packets (or confirmation packets) from all the other nodes (nodes 2' and 3' in this embodiment) connected to the serial bus 16 through the asynchronous transmission according to the IEEE 1394, the bus manager 121' issues a bus reset issuance request to the physical layer 15, and initializes the serial bus 16 (at a step S46). At this time, the physical layer 15 receives the request from the bus manager 121' and then starts a bus reset (Bus Reset), Tree ID, and Self ID to the serial bus 16 (see FIG. 8). If a communication can be made available and the cycle change waiting time passes, the cycle master 123 issues a transfer request of a cycle start packet C-E to the cycle control circuit 141. The cycle control circuit 141 receives the transfer request of the cycle start packet C-E and generates the cycle start packet C-E (at a step S48), and transfers the generated cycle start packet C-E to the serial bus 16 (at a step S50).

The data transfer circuit 142 of the node 1' transmits the cycle start packet C-E to the serial bus 16 and then restarts transfer of data packets (at a step S52). Likewise, the data transfer circuit 142 of each of the nodes 2' and 3' receives the data packet cycle start packet C-E and then restarts transfer of data packets (at steps S54 and 356). For instance, referring to FIG. 8, the node 1 transfers the isochronous packet I-E1 to the serial bus 16, and the node 2 transfers the isochronous packet I-E2 to the serial bus 16. In addition, the node 1 transfers the asynchronous packet A-E1 to a designated node.

After passage of the cycle time N-E designated by the cycle manager 124, the cycle master 123 of the node 1' issues a transfer request of the cycle start packet C-F to the cycle control circuit 141. The cycle control circuit 141 receives the transfer request of the cycle start packet C-F, and then generates the cycle start packet C-F (at a step S48), and transfers the generated cycle start packet C-F to the serial bus 16 (at a step S50). The data transfer circuit 142 of the node 1' transmits the cycle start packet C-F to the serial bus 16 and then restarts transfer of data packets (at a step S52). Likewise, the data transfer circuit 142 of each of the nodes 2 and 3 receives the data packet cycle start packet C-F and then restarts transfer of data packets (at steps 554 and S56). For instance, referring to FIG. 8, the node 1 transfers the isochronous packet I-F1 to the serial bus 16, and the node 2 transfers the isochronous packet I-F2 to the serial bus 16. In addition, the node 1 transfers the asynchronous packet A-F1 to a designated node.

In this way, the cycle start packet C can be transferred for every cycle time N set newly in response to the instruction from the cycle manager 124 of the node 1. In addition, the nodes 1 to 3 can transmit isochronous packets for every cycle time N set newly (at the steps S48 to S56).

As stated above, the system bus 16 is reset once and reconfigured before the cycle time is set. Thus, any failure in change of the cycle time can be suppressed. Therefore, the communication system according to the second embodiment is higher in reliability than that according to the first embodiment. In case of the communication system according to the first embodiment, phases of stopping, waiting, and restarting transfer of data when the cycle time is changed are unstable, so that the entire serial bus 16 may be made unstable. It is noted, however, that since the bus reconfiguration is performed, it takes long time to restart transferring data after the cycle time is changed according to the second embodiment, as compared with the first embodiment.

As stated above, in the communication system according to the second embodiment, by transmitting the cycle setting packet CS, all the nodes 1 to 3 connected to the serial bus 16 can share cycle time data. The nodes 1 to 3 stop transferring packets and wait for a certain time before completion of the setting. The packet transfer cycle (cycle time N) of the entire serial bus 16 can be changed. By so setting, the delay time of the serial bus transmission system can be reduced to a smallest packet length (e.g., several hundred nanoseconds according to the IEEE 1394).

The communication system and the communication method according to the present invention can reduce the delay time deriving from guarantee of the cycle time for the isochronous transmission. Thus, the embodiments of the present invention have been described in detail. However, a specific configuration of the present invention is not limited to the embodiments but can be changed and modified within the scope of the spirit of the present invention. If a cycle variable register as means for making timing of transmitting synchronous packets variable, and a function for propagating the timing to the other devices and for starting a communication in a new cycle are provided, the IEEE 1394-compliant communication system employed in the embodiments of the present invention may be replaced by a communication system that uses a serial bus including 8B10B or a scrambler/describer, a communication system that uses a serial bus in a mode of arbitration for a transmission right to the bus, or a communication system such as the Ethernet (trademark).

What is claimed is:

1. A communication system carrying out an isochronous transfer, and comprising a cycle master node and nodes connected with each other through a system bus,
wherein said cycle master node sets a cycle time of said isochronous transfer and transfers a cycle start packet onto said system bus for every said cycle time, and
each of said nodes transfers an isochronous packet onto said system bus in response to said cycle start packet, wherein said cycle master node transfers a cycle setting packet to said nodes to set said cycle time,
each of said nodes sets said cycle time when receiving said cycle setting packet and transfers a confirmation packet to said cycle master node, and
said cycle master node transfers said cycle start packet onto the system bus for every said cycle time when receiving said confirmation packets from all of said nodes to which said cycle setting packet is transferred.
wherein said cycle setting packet is transferred to said nodes in an asynchronous transfer, and
each of said nodes transfers an acknowledgement packet to said cycle master node in the asynchronous transfer as the confirmation packet.

2. The communication system according to claim 1, wherein when receiving said cycle setting packet, each of said nodes stops a data transfer during a predetermined waiting time for cycle change.

3. The communication system according to claim 1, wherein when receiving said confirmation packets from all of said nodes to which said cycle setting packet is transferred, said cycle master node resets said system bus and transfers said cycle start packet onto the system bus for every said cycle time.

4. A communication method in a communication system which carries out an isochronous transfer and which comprises a cycle master node and nodes connected with each other through a system bus, comprising:
setting a cycle time of the isochronous transfer by said cycle master node;
transferring a cycle start packet from said cycle master node onto said system bus for every said cycle time; and
transferring an isochronous packet onto said system bus from said nodes in response to said cycle start packet, further comprising:
transferring a cycle setting packet from said cycle master node to said nodes such that said cycle time is set;
setting said cycle time in response to reception of said cycle setting packet in each of said nodes; and
transferring a confirmation packet from each of said nodes to said cycle master node; and
transferring a cycle start packet from said cycle master node onto said system bus for every said cycle time after receiving said confirmation packets from all of said nodes to which said cycle setting packet is transferred.
wherein said transferring said cycle setting packet comprises:
transferring said cycle setting packet from said cycle master node to said nodes in an asynchronous transfer, and
wherein said transferring said confirmation packet further comprises transferring said confirmation packet from each of said nodes to said cycle master node in the asynchronous transfer.

5. The communication method according to claim 4, further comprising:
stopping a data transfer during a predetermined cycle change waiting time in each of said nodes in response to reception of said cycle setting packet.

6. The communication method according to claim 4, further comprising:
resetting said system bus by said cycle master node after receiving said confirmation packets from all of said nodes to which said cycle setting packet is transferred,
wherein said transferring said cycle start packet onto said system bus for every said cycle time is executed after said resetting said system bus.

* * * * *

UNITED STATES PATENT AND TRADEMARK OFFICE
CERTIFICATE OF CORRECTION

PATENT NO. : 7,826,492 B2  
APPLICATION NO. : 11/440399  
DATED : November 2, 2010  
INVENTOR(S) : Junichi Takeuchi Page 1 of 1

It is certified that error appears in the above-identified patent and that said Letters Patent is hereby corrected as shown below:

Column 2, Line 60: Delete "μus." and insert -- μs. --  
Column 3, Line 18: Delete "I-E1," and insert -- I-B1, --  
Column 7, Line 2: After "receiving" delete "s"  
Column 7, Line 27: Delete "16," and insert -- 16. --  
Column 8, Line 35: Delete "512)." and insert -- S12). --  
Column 8, Line 58: Delete "522" and insert -- S22 --  
Column 9, Line 23: Delete "time)" and insert -- time). --  
Column 10, Line 30: Delete "356)." and insert -- S56). --  
Column 10, Line 48: Delete "554" and insert -- S54 --  
Column 11, Line 49: In Claim 1, delete "transferred." and insert -- transferred, --  
Column 12, Line 31: In Claim 4, delete "transferred." and insert -- transferred, --

Signed and Sealed this  
Twenty-sixth Day of April, 2011

David J. Kappos  
*Director of the United States Patent and Trademark Office*